Patented Apr. 3, 1934

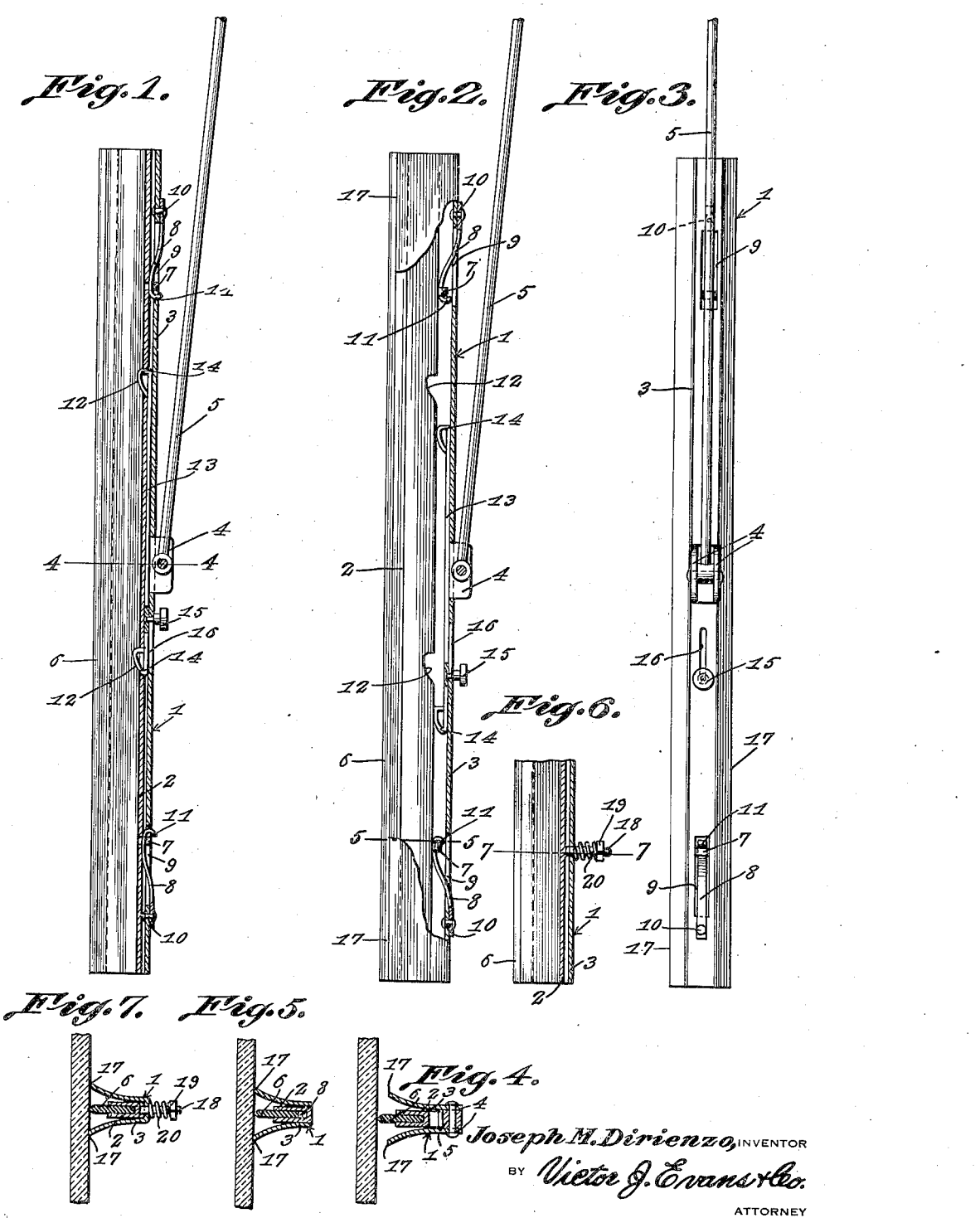

1,953,703

UNITED STATES PATENT OFFICE 1,953,703

COMBINED WINDSHIELD WIPER AND SLEET AND SNOW REMOVER

Joseph M. Dirienzo, Madison, Wis.

Application September 28, 1932, Serial No. 635,295

1 Claim. (Cl. 15—250)

This invention relates to wiper blades especially adapted for windshield wipers, and has for its primary object, the provision of a device of the above stated character which may be adjusted to act as an ordinary wiper blade to effectively remove moisture or rain from the glass of a windshield and may be adjusted to position scrapers in engagement with the glass for efficiently removing sleet, snow or the like which may adhere to the glass, consequently with a device of this character in use the driver of a vehicle will be assured of clear vision.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a wiper blade constructed in accordance with my invention.

Figure 2 is a similar view to Figure 1 showing the device adjusted to act as an ordinary wiper.

Figure 3 is a plan view illustrating the device.

Figure 4 is a transverse sectional view taken on the line 4—4 of Figure 1.

Figure 5 is a similar view taken on the line 5—5 of Figure 2.

Figure 6 is a detail sectional view illustrating a modified form of my invention.

Figure 7 is a sectional view taken on the line 7—7 of Figure 6.

Referring in detail to the drawing, the numeral 1 indicates as an entirety a wiper blade attachable to any conventional type of wiper and includes inner and outer shells 2 and 3. The outer shell 3 has struck up therefrom spaced ears 4 to which the usual wiping arm 5 is pivoted. The inner shell is of substantially U-shape in cross section and carries a wiper blade 6 constructed of rubber or any other material suitable for the purpose. Apertured ears 7 are formed on the inner shell and slidably receive leaf springs 8 extending through slots 9 in the outer shell and fastened to the latter, as shown at 10. The free ends of the leaf springs 8 are bent into hook formation, as shown at 11, to prevent the inner shell from becoming detached from the leaf springs. The inner shell is provided with spaced notches 12 and positioned between said inner shell and outer shell is a key 13 having enlarged ends 14. The key is slidably secured to the outer shell by a finger piece 15 operating in a slot 16. The sides of the outer shell are flared outwardly and sharpened to form scraping edges 17. The key 13 is positioned so that the enlargements 14 enter the notches 12 of the inner shell and permits the latter to move inwardly under the influence of the leaf springs 8 positioning the wiper blade 6 inwardly of the scraping edges 17 of the outer shell. The scraper edges then may act upon the glass of a windshield for the purpose of removing therefrom sleet, snow or the like which may become frozen or adhered to the glass. By shifting the position of the key 13 to move the enlargements 14 out of the notches 12 they will cause the inner shell to move outwardly relative to the outer shell, positioning the wiper blade 6 outwardly of the scraper edges 17 for contact with the glass so that the device may act as an ordinary wiper for removing moisture, rain or the like from the glass.

Instead of employing the leaf springs 8, threaded shanks 18 may be formed on the inner shell and extend through apertures in the outer shell and have threaded thereon nuts 19 engaged by coil springs 20 which bear against the outer shell, normally urging the inner shell inwardly of the outer shell.

From the foregoing description taken in connection with the drawing it will be noted that a wiper has been provided wherein it may be readily adjusted to either act as a conventional type of wiper or as a scraper for removing sleet, snow or the like from the glass of a windshield, this adjustment being easily accomplished by sliding the finger piece 15 in the slot 16.

The outer shell provides a protection to the wiper blade 6 against sun rays, thereby increasing the life of the blade.

While I have shown and described the preferred embodiment of my invention, it will be understood that minor changes in construction, combination and arrangement of parts may be made without departing from the spirit and scope of my invention, as claimed.

Having described the invention, I claim:

A wiper element comprising an outer member of substantially U-shaped cross section having oppositely arranged scraping edges, an inner member slidable laterally in said outer member and having notches in the inner wall thereof, a wiper strip carried by the inner member, spring means connected between said inner and outer members for positioning the wiper strip inwardly of the scraping edges, and a key slidably secured to the outer member and having enlargements to engage said inner wall of the inner member for positioning the wiper strip to extend outwardly beyond the scraping edges, said key movable on the outer member to position the enlargements opposite the notches so as to be received by the latter to permit the spring means to position the wiper strip inwardly of the scraping edges.

JOSEPH M. DIRIENZO.